US012071888B2

(12) United States Patent
Eckl et al.

(10) Patent No.: US 12,071,888 B2
(45) Date of Patent: Aug. 27, 2024

(54) TURBINE HOUSING AND MANIFOLD ASSEMBLY WITH CONTROL VALVE

(71) Applicant: Garrett Transportation I Inc., Torrance, CA (US)

(72) Inventors: Filip Eckl, Brno (CZ); Laurentius Walter Cosmas Jaeger, Brno (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 18/088,418

(22) Filed: Dec. 23, 2022

(65) Prior Publication Data

US 2024/0209771 A1 Jun. 27, 2024

(51) Int. Cl.
*F02B 37/02* (2006.01)
*F02B 37/12* (2006.01)
*F02D 9/06* (2006.01)

(52) U.S. Cl.
CPC ............ *F02B 37/025* (2013.01); *F02B 37/12* (2013.01); *F02D 9/06* (2013.01); *F05D 2220/40* (2013.01); *F05D 2260/60* (2013.01)

(58) Field of Classification Search
CPC .......... F02B 37/025; F02B 37/12; F02D 9/06; F05D 2220/40; F05D 2260/60
See application file for complete search history.

(56) References Cited

U.S. PATENT DOCUMENTS 4,138,849 A * 2/1979 Wilber .................... F02B 37/22 138/45
4,165,763 A * 8/1979 Hough .................. F16K 11/085 137/625.48
4,220,008 A * 9/1980 Wilber ...................... F02D 9/16 341/200
4,224,794 A * 9/1980 Woollenweber ........ F02B 37/22 123/320
5,839,281 A 11/1998 Sumser et al.
6,647,934 B2 * 11/2003 Marsh ................... F02B 39/005 60/599
7,523,736 B2 * 4/2009 Rammer ................... F02D 9/06 60/602
10,151,237 B2 * 12/2018 McGahey ............... F16K 3/085
10,590,838 B2 * 3/2020 Rankenberg .......... F02B 37/183
10,677,150 B2 * 6/2020 Babak ..................... F01D 25/24
2004/0244373 A1 * 12/2004 Frankenstein ........ F02B 37/025 60/605.1
2008/0000460 A1 * 1/2008 Hertweck ............. F02B 37/025 123/559.1

(Continued)

FOREIGN PATENT DOCUMENTS

EP 1762716 A1 * 3/2007 ........... F01D 17/148

OTHER PUBLICATIONS

Translation—EP-1762716-A1 (Year: 2023).*

*Primary Examiner* — J. Todd Newton
(74) *Attorney, Agent, or Firm* — BelayIP

(57) ABSTRACT

A turbine assembly can include a manifold that includes separate conduits for receipt of exhaust from a first number of cylinders and a second number of cylinders, turbine inlet passages and a valve seat disposed between the separate conduits and the turbine inlet passages; and a valve set in the valve seat that includes a rotational axis and an outer surface that includes separate recesses, where rotation of the valve controls exhaust flow from the separate conduits to the turbine inlet passages.

19 Claims, 15 Drawing Sheets

(56) References Cited

U.S. PATENT DOCUMENTS

| | | | | |
|---|---|---|---|---|
| 2011/0000208 | A1* | 1/2011 | Robinson | F02B 37/16 60/602 |
| 2015/0337717 | A1* | 11/2015 | Robinson | F02D 9/06 417/245 |
| 2018/0023460 | A1* | 1/2018 | Mawer | F16K 11/076 251/304 |

* cited by examiner

TURBINE HOUSING AND MANIFOLD ASSEMBLY WITH CONTROL VALVE

TECHNICAL FIELD

Subject matter disclosed herein relates generally to turbochargers.

BACKGROUND

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1A:
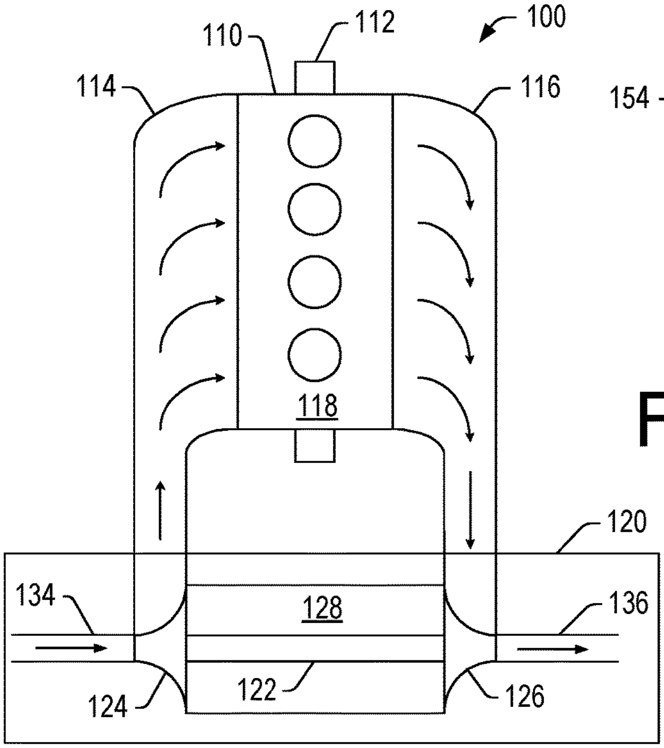
FIGS. 1A, 1B, 1C, 1D, and 1E are diagrams of an example of a system, examples of manifolds and turbochargers, an example of a vehicle, and an example of a turbocharger operatively coupled to a controller.

Turbochargers are frequently utilized to increase output of an internal combustion engine. Referring to FIG. 1A, as an example, a system 100 can include an internal combustion engine 110 and a turbocharger 120. As shown in FIG. 1D, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1D, a treatment unit 107 may be provided to treat exhaust (e.g., to reduce emissions via catalytic conversion of molecules, etc.).

As shown in FIG. 1A, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1A and FIG. 1E, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1E, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1E, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1E, an exhaust gas recirculation (EGR) conduit 115 is also shown, which may be provided, optionally with one or more valves 117, for example, to allow exhaust to flow to a position upstream the compressor wheel 125.

Figure 1B:
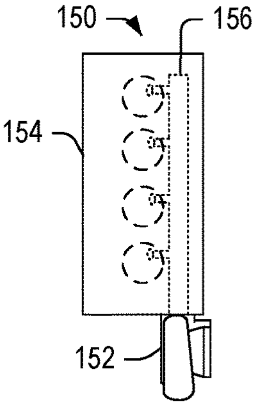
Figure 1C:
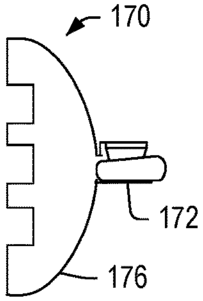
Figure 1D:
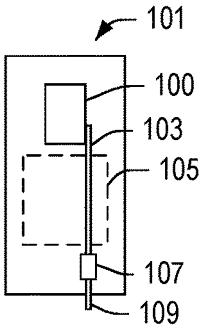
Figure 1E:
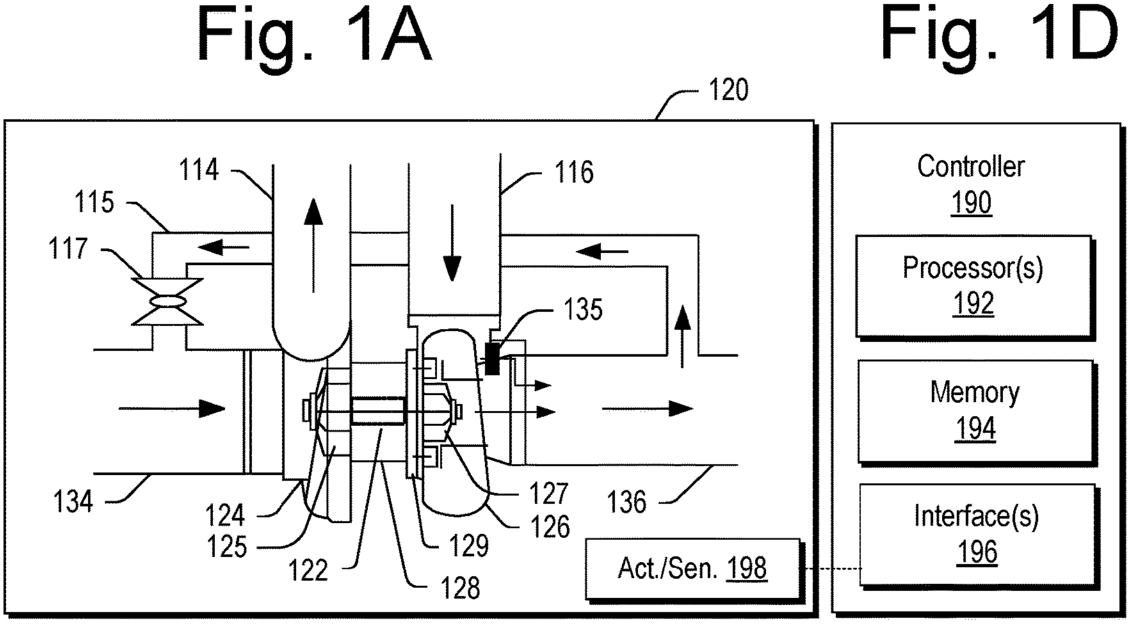

In FIG. 1B, an example arrangement 150 for flow of exhaust to an exhaust turbine housing assembly 152 is shown and, in FIG. 1C, another example arrangement 170 for flow of exhaust to an exhaust turbine housing assembly 172 is shown. In the arrangement 150 of FIG. 1B, a cylinder head 154 includes passages 156 within to direct exhaust from cylinders to the turbine housing assembly 152 while in the arrangement 170 of FIG. 1C, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1E, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), exhaust gas recirculation (EGR), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

An internal combustion engine such as the engine 110 of FIG. 1A may generate exhaust gas with pulsating flow. In so-called constant-pressure turbocharging (e.g., Stauaufladung), an exhaust gas manifold of sufficiently large volume may act to damp out mass flow and pressure pulses such that flow of exhaust gas to a turbine is relatively steady. Another approach, referred to as pulse turbocharging (e.g., Stoßaufladung), may aim to utilize kinetic energy of exhaust gas as it exits cylinder exhaust ports. For example, relatively short, small-cross section conduits may connect each exhaust port to a turbine so that much of the kinetic energy associated with the exhaust blowdown can be utilized. As an example, suitable groupings of different cylinder exhaust ports may organize exhaust gas pulses such that they are sequential, for example, with minimal overlap. In such a manner, exhaust gas flow unsteadiness may be held to an acceptable level. As an example, decisions as to implementation of constant-pressure or pulse turbocharging may depend on one or more factors such as, for example, power demands, efficiency demands, fuel type, number of cylinders, cylinder/stroke volume, engine size, etc.

As explained, gas can be routed to a turbine wheel disposed in a turbine housing where the gas can be directed to the turbine wheel via one or more scrolls (e.g., one or more volutes). A scroll or scrolls can include a substantially cylindrical inlet and a substantially annular outlet. A scroll may be characterized by an area over radius ratio (A/R). A/R is defined as the inlet (or, for compressor housings, the discharge) cross-sectional area divided by the radius from a turbine centerline to the centroid of that area. As a scroll decreases in its cross-sectional flow area as it spirals radially inwardly from its inlet to its annular nozzle, both area and radius change. A/R can be selected based on various factors to help assure that, as an internal combustion engine produces exhaust gas that flows through a turbine housing, it propels a turbine wheel in an effective manner. Selection of the appropriate A/R can help to optimize performance. For example, a too small A/R can bottleneck the exhaust gas and loose power, particularly in an upper region of the RPM powerband; whereas, a too large A/R can make a turbine slow to react to changes in exhaust gas flow.

As explained, a turbine housing may be integral to or operatively coupled to a manifold (see, e.g., FIG. 1C), which may be referred to as a turbine housing and manifold assembly or, for example, a turbine assembly. In such an example, various internal passages can provide for flow of gas from cylinders to one or more volutes. As an example, a turbine housing and manifold assembly can include a valve that can control gas flow in the various internal passages. For example, consider a rotating valve that can be rotated to at least partially close and/or at least partially open one or more passages. While passage from an inlet to a scroll outlet are mentioned, a passage may be an exhaust gas recirculation (EGR) passage that can direct gas to a conduit for purposes of EGR.

EGR may be implemented as part of a NOx emission control technique, for example, applicable to a wide range of diesel engines from light-, medium- and heavy-duty diesel engines to two-stroke low-speed marine engines. EGR systems are also used in various categories of Otto cycle engines, where the benefits may range from improved efficiency (e.g., reduced fuel consumption) to reduced methane slip in low speed dual fuel engines. The configuration of an EGR system can depend on a required EGR rate and/or one or more other demands of a particular application. As an example, an EGR system can include one or more EGR control valves, one or more EGR coolers, piping, flanges, gaskets, etc.

As an example, a turbine assembly can include a manifold that includes separate conduits for receipt of exhaust from a first number of cylinders and a second number of cylinders, turbine inlet passages and a valve seat disposed between the separate conduits and the turbine inlet passages; and a valve set in the valve seat that includes a rotational axis and an outer surface that includes separate recesses, where rotation of the valve controls exhaust flow from the separate conduits to the turbine inlet passages. In such an example, the turbine assembly may include an EGR passage where rotation of the valve can control exhaust flow to the EGR passage.

As an example, a valve can be controllable to distribute flow from manifold branches to one or more volutes of a turbine housing. As mentioned, a valve may be rotatable. For example, consider a rotatable valve that has can be rotated to form two flow passages to one or more volutes in an open state and that can be rotated to at least partially close at least one of the two flow passages in a closed state or a restricted state, which may reduce an effective area of gas flow such that the valve works as a brake valve. As an example, a valve may be rotatable such that flow may be restricted in a manner that depends on rotational position. In such an example, a valve controller may cause the valve to achieve a desired amount of flow restriction. In such an example, the valve controller can include an actuator, which may be, for example, an electric actuator.

As an example, a valve may provide for complete closure of one or more passages and/or may be configured such that one or more passages cannot be fully closed. For example, consider a valve that cannot close a particular passage or passages such that some amount of free area is available for gas to flow to a turbine wheel space of a turbine housing. As an example, a valve can include one or more features for purposes of closing and opening an EGR passage such that, for example, the valve can help to guide gas flow otherwise directed to one (or two) volutes to an EGR bypass outlet.

Figure 2A:
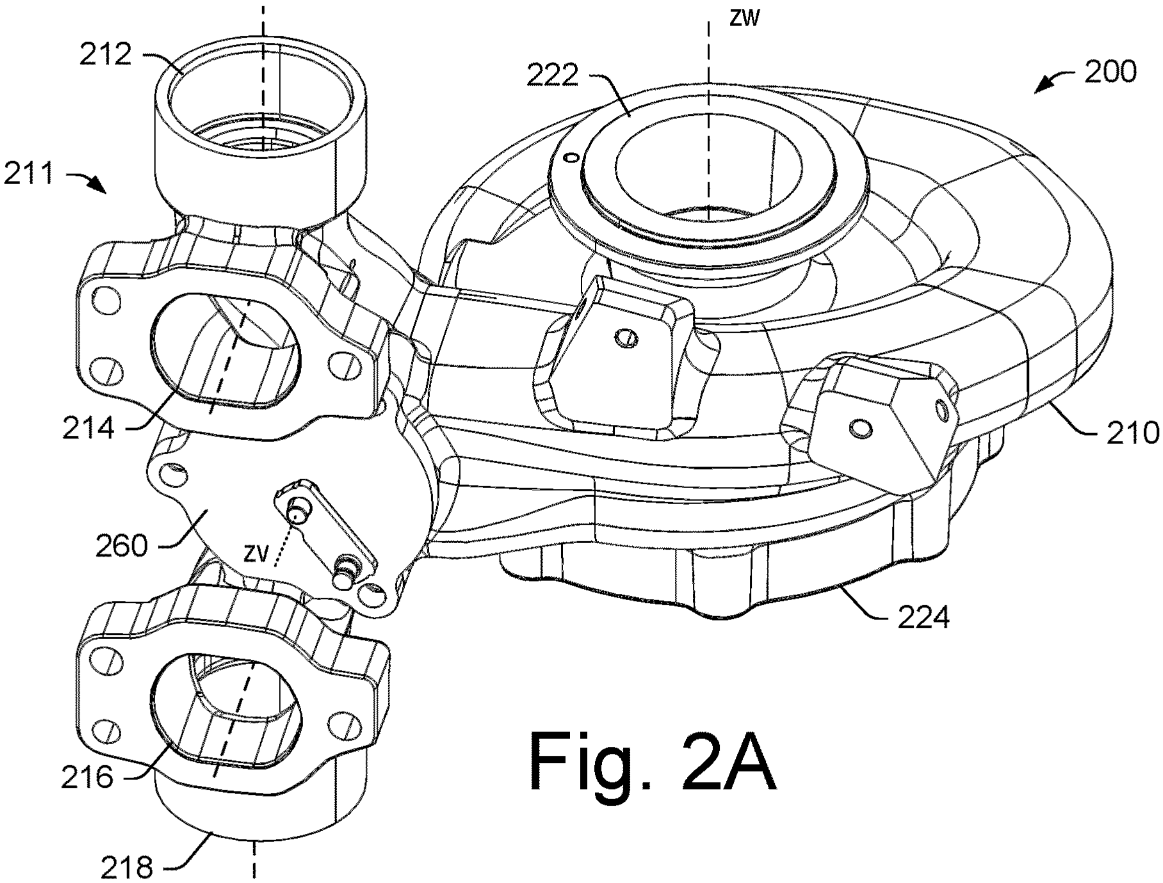
FIGS. 2A and 2B are diagrams of an example of a turbine assembly.
Figure 2B:
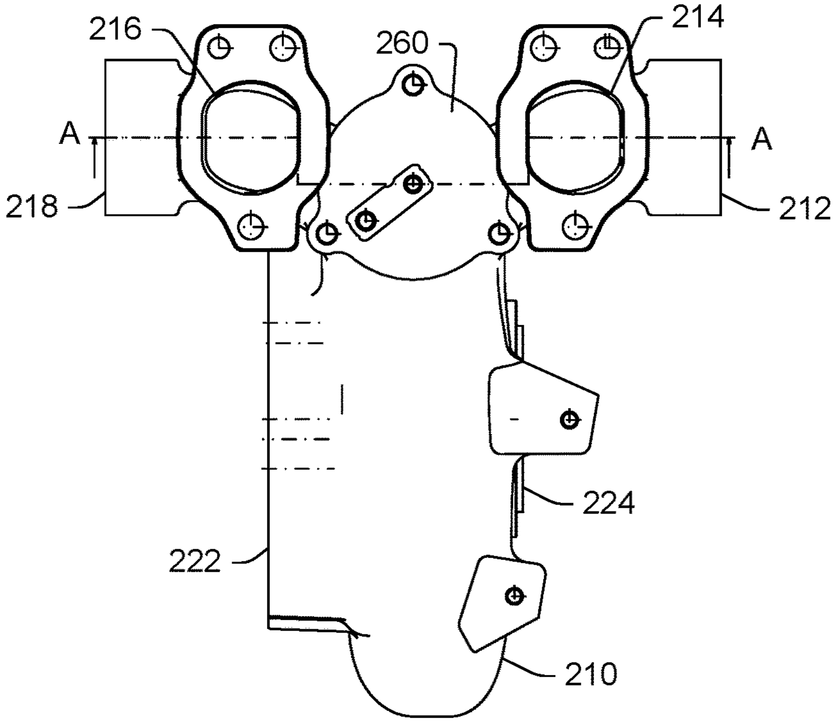

FIG. 2A and FIG. 2B show an example of a turbine assembly 200 that includes a turbine housing 210 and a manifold 211. As shown, the turbine assembly 200 can include a valve assembly 260 that can control gas flow from inlets 212, 214, 216 and 218 to one or more scrolls defined by the turbine housing 210. As shown, the turbine housing 210 can include an outlet 222 and a mount 224, which may be center housing mount (see, e.g., FIG. 1E). In the example of FIG. 2A and FIG. 2B, one or more cylindrical coordinate systems (e.g., z, r and Θ) may be utilized to define one or more features of the turbine assembly 200. As an example, one cylindrical coordinate system may be defined with respect to a central axis zw of the turbine housing 210 while another cylindrical coordinate system may be defined with respect to a control axis zv of the valve assembly 260. In such an example, the axis zw can be aligned with a rotational axis of a turbine wheel and the axis zv can be an axis by which the valve assembly 260 may be controlled.

Figure 3A:
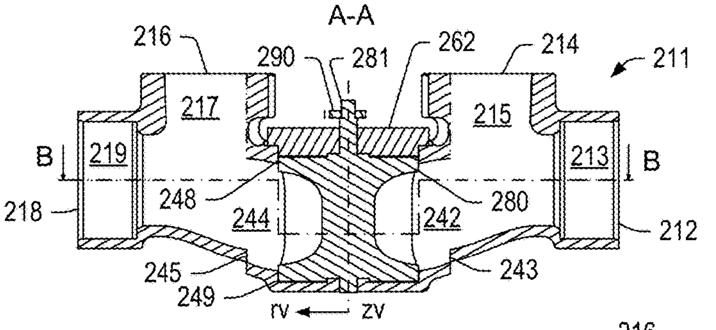
FIGS. 3A, 3B, 3C, and 3D are cross-sectional views of a portion of a turbine assembly.
Figure 3B:
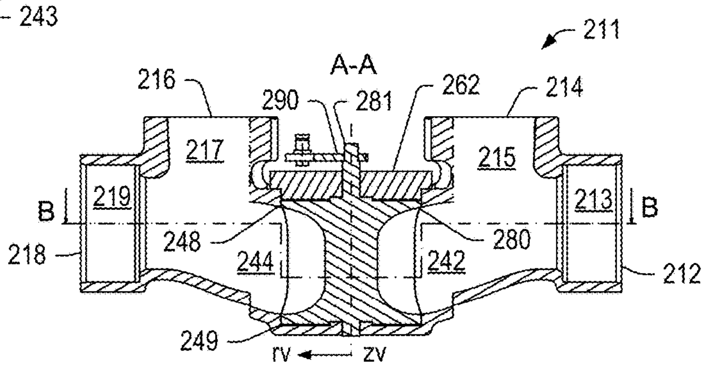
Figure 3C:
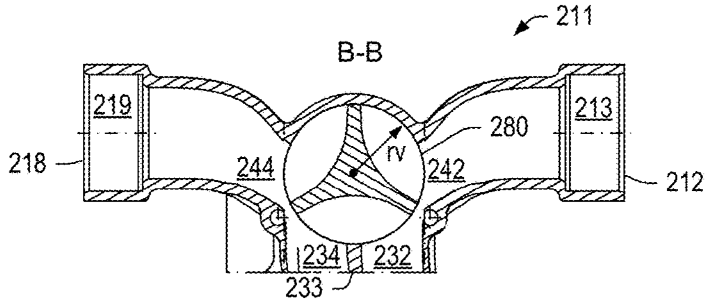
Figure 3D:
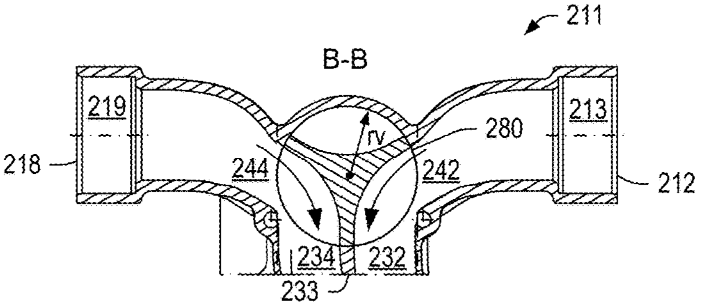

FIG. 3A, FIG. 3B, FIG. 3C, and FIG. 3D show cross-sectional views through the manifold 211 of the turbine assembly of FIG. 2A and FIG. 2B. In particular, the views of FIG. 3A and FIG. 3B are along a line A-A as shown in FIG. 2B and the views of FIG. 3C and FIG. 3D are along a line B-B as shown in FIG. 3A and FIG. 3B. As shown, the axis zv may be utilized to define a radial coordinate rv where one or more features may be defined with respect to zv and/or rv.

As shown in FIG. 3A and FIG. 3B, the inlet 212 can lead to a passage 213, the inlet 214 can lead to a passage 215, the inlet 216 can lead to a passage 217 and the inlet 218 can lead to a passage 219 where the passages 213 and 215 join to form a passage 242 and where the passages 217 and 219 join to form a passage 244.

As shown in FIG. 3A and FIG. 3B, the valve assembly 260 can include a cap 262 and a valve element 280 where the valve element 280 can be received via an opening 248 to be seated in a valve seat 249, the cap 262 positioned to close the opening 248 and where a control arm 290 can be fit to an axle 281 of the valve element 280 for purposes of controllably rotating the valve element 280 of the valve assembly 260 such that flow from the passages 242 and 244 can be controlled. As may be indicated at least by the positions of the control arm 290, the rotational position of the valve element 280 is different in the views of FIG. 3A and FIG. 3B, as may be clear upon examination of the views of FIG. 3C and FIG. 3D. As an example, the valve element 280 may be referred to as a valve such as, for example, a rotatable valve.

As shown in the views of FIG. 3A and FIG. 3B, the valve seat 249 may be formed as part of the manifold 211 where the manifold 211 may be cast to form the passages 242 and 244 as conduits or conduit portions of the manifold 211. For example, consider a first conduit 243 as defining at least a portion of the passage 242 and a second conduit 245 as defining at least a portion of the passage 244. As shown, the first conduit 243 and the second conduit 245 may be integral to the manifold 211 and integral to a valve region, for example, integral to the valve seat 249. As an example, the valve seat 249 can include a socket or bushing for receipt of a portion of the axle 281 of the valve element 280. As an example, the valve element 280 may include a bore where an axle is received by the bore. As an example, the cap 262 may form a valve seat portion. For example, the valve seat 249 may be an aft valve seat portion and the cap 262 may form a fore valve seat portion where the valve element 280 is rotatable about a longitudinal axis with respect to such valve seat portions. As an example, the cap 262 may be threaded, welded, interference fit, etc., to fix it to the manifold 211 to secure the valve element 280 with respect to the valve seat 249.

In FIG. 3C and FIG. 3D, the valve element 280 is in two different positions where the position of the valve element 280 in FIG. 3C is a restricted position for flow from the passages 242 and 244 to passages 232 and 234, respectively, where the passages 232 and 234, as separated by a wall 233, lead to one or more scrolls of the turbine housing 210, and where the position of the valve element 280 in FIG. 3D is an open position (e.g., unrestricted position) for flow from the passages 242 and 244 to passages 232 and 234, respectively. As an example, the passages 242 and 244 may be referred to as conduit passages and/or conduits (e.g., separate conduits, separated by the valve element 280). As shown, the valve element 280 may be rotated about the axis zv to appropriately position the valve element 280 for fluid flow control, for example, via an actuator operatively coupled to the control arm 290. As an example, an actuator may be an electrical actuator, a mechanical actuator, a pneumatic actuator, a hydraulic actuator, etc. As an example, an actuator may be operatively coupled to a controller (see, e.g., the controller 190 of FIG. 1E) to provide for control of the valve element 280. In the example of FIG. 3C and FIG. 3D, the valve element 280 is rotated by approximately 30 degrees (e.g., plus or minus 10 degrees), which may be measured using a cylindrical coordinate system, for example, consider an azimuthal angle of a cylindrical coordinate system centered on zv. In the open position of FIG. 3D, the valve element 280 includes two recesses that are separated by a portion of an outer surface of the valve element 280 that is aligned with the wall 233.

As explained, the valve element 280 can be rotated to restrict flow in passages of the turbine assembly 200. As an example, the valve element 280 may be supported by the axle 281, which may be secured at one end via the cap 262 and which may be secured at an opposing end via a seat (e.g., a seat in the manifold 211). In such an example, the valve element 280 may be reliably rotatable with minimal risk of sticking such that gas flow to a turbine housing can be controlled for one or more purposes. For example, in the restricted position of FIG. 3C, the valve element 280 may act to promote braking, for example, via an increase in exhaust backpressure for one or more cylinders (e.g., along with slowing energy supplied to a turbine wheel).

Figure 4A:
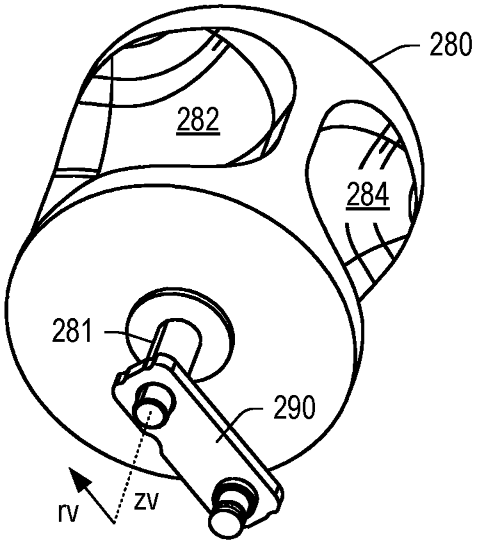
FIGS. 4A, 4B, and 4C are perspective views of an example of a valve element.
Figure 4B:
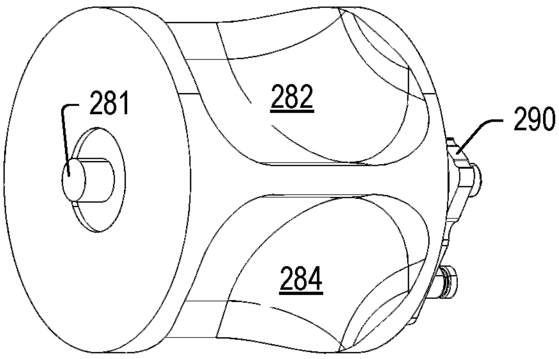
Figure 4C:
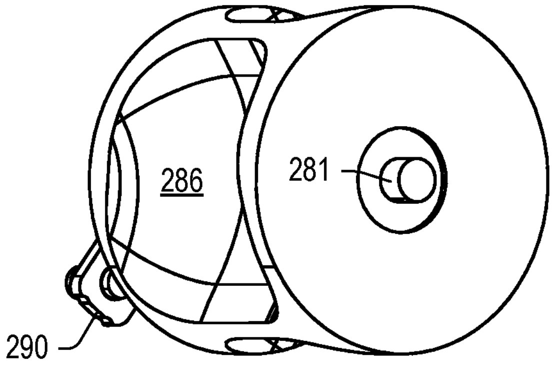

FIG. 4A, FIG. 4B and FIG. 4C show perspective views of the valve element 280 of FIG. 3C and FIG. 3D. As shown, the valve element 280 can include recesses 282, 284, and 286, which may be pair-wise symmetrical about a plane that passes through a central axis (e.g., rotational axis) of the valve element 280 (see, e.g., FIG. 3C and FIG. 3D). As an example, a recess or recesses may be defined as concave regions of a cylindrical body. For example, consider a cylindrical body that can be formed with concave regions, which may be separated from each other (e.g., discrete recesses). As an example, a valve body may be formed by one or more of casting, machining, assembling, etc. As an example, a valve body may be made of a metallic material (e.g., a metal or an alloy) that has sufficient integrity to withstand operating conditions (e.g., exhaust temperatures, etc.).

Figure 5A:
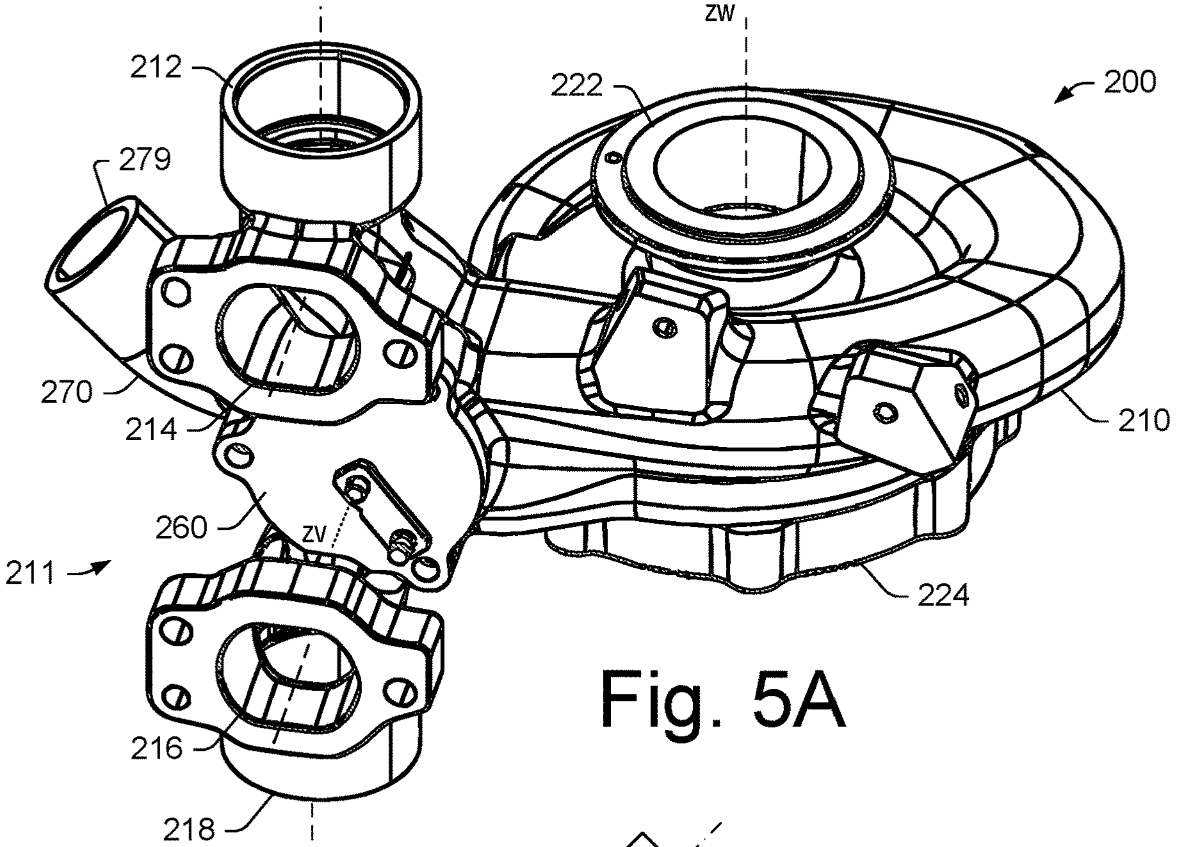
FIGS. 5A and 5B are diagrams of an example of a turbine assembly.
Figure 5B:
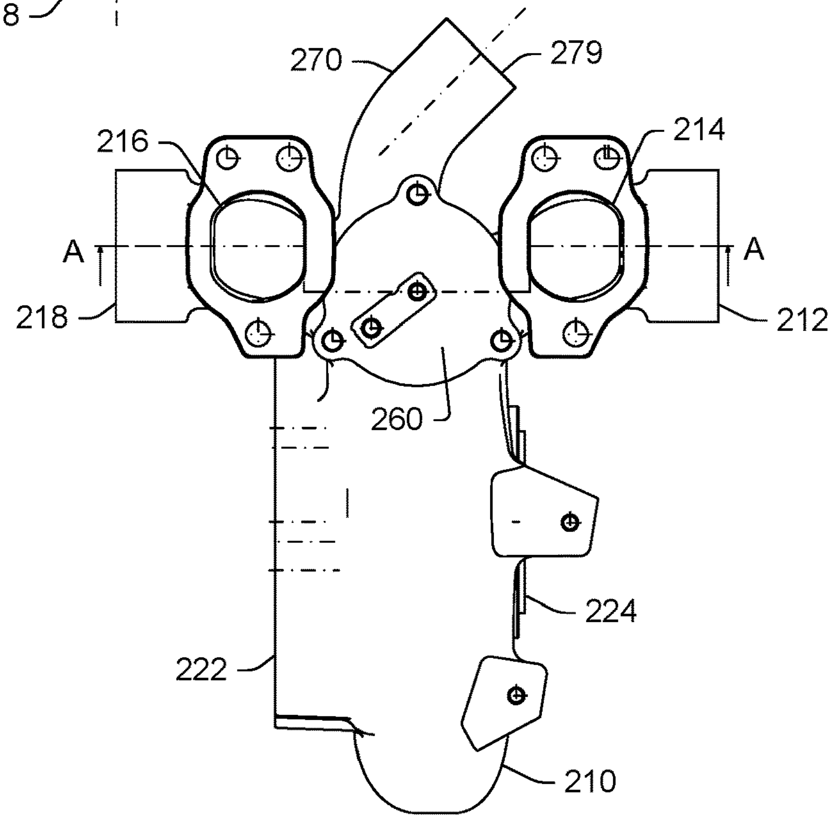

FIG. 5A and FIG. 5B show an example of the turbine assembly 200 as including an EGR conduit 270 that includes an EGR outlet 279.

Figure 6A:
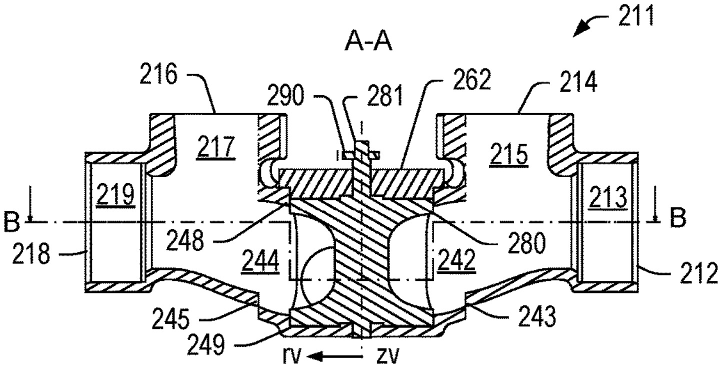
FIGS. 6A, 6B, 6C, and 6D are cross-sectional views of a portion of a turbine assembly.
Figure 6B:
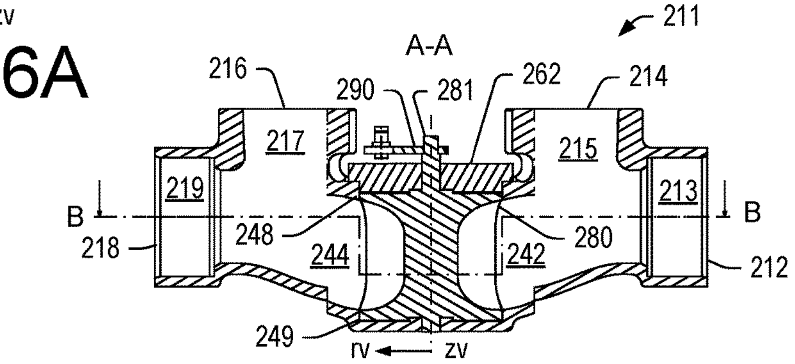
Figure 6C:
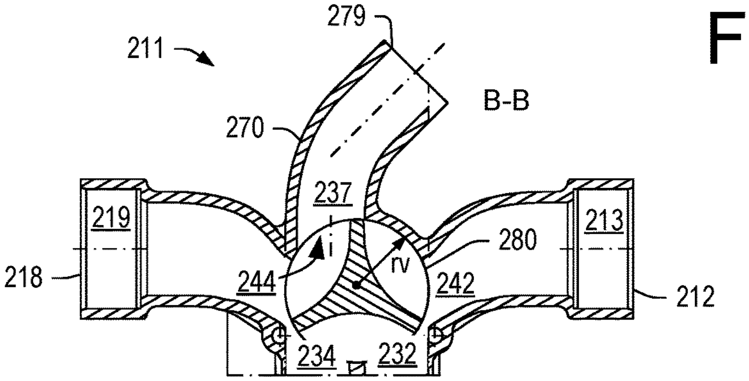
Figure 6D:
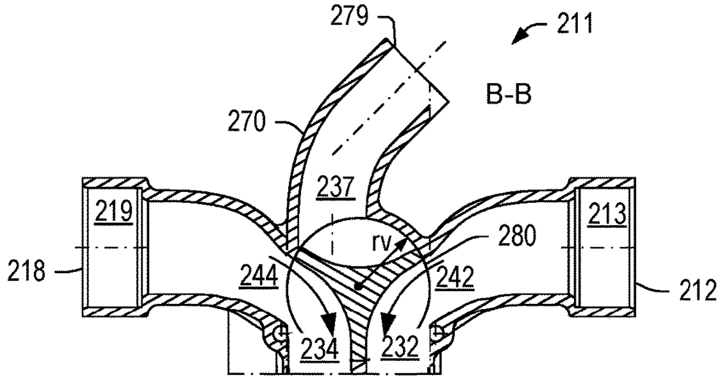

FIG. 6A, FIG. 6B, FIG. 6C, and FIG. 6D show cross-sectional views through the manifold 211 of the turbine assembly of FIG. 5A and FIG. 5B. In particular, the views of FIG. 6A and FIG. 6B are along a line A-A as shown in FIG. 5B and the views of FIG. 6C and FIG. 6D are along a line B-B as shown in FIG. 6A and FIG. 6B.

In FIG. 6C and FIG. 6D, the valve element 280 is in two different positions where the position of the valve element 280 in FIG. 6C is a restricted position for flow from the passages 242 and 244 to passages 232 and 234, respectively, where the passages 232 and 234 lead to one or more scrolls of the turbine housing 210, and where the position of the valve element 280 in FIG. 6D is an open position (e.g., unrestricted position) for flow from the passages 242 and 244 to passages 232 and 234, respectively.

As shown in FIG. 6C and FIG. 6D, the EGR conduit 270 forms a passage 237 where in the restricted position of FIG. 6C, gas can flow from the passage 244 to the passage 237; whereas, in the unrestricted position of FIG. 6D, gas cannot flow from the passage 242 or the passage 244 to the passage 237. In the example of FIG. 6C, braking may be effectuated along with EGR. In the example of FIG. 6C and FIG. 6D, the valve element 280 is rotated by approximately 30 degrees (e.g., plus or minus 10 degrees), which may be measured using a cylindrical coordinate system, for example, consider an azimuthal angle of a cylindrical coordinate system centered on zv.

Figure 7A:
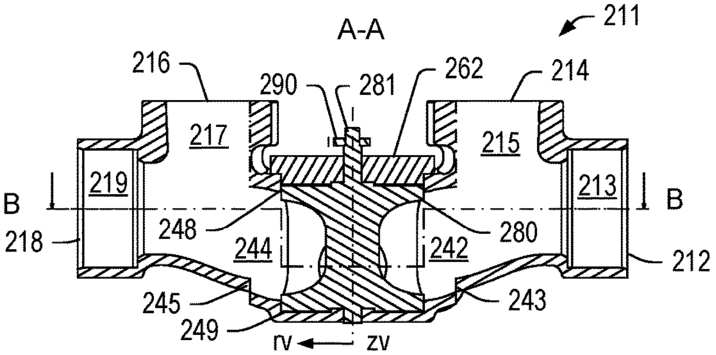
FIGS. 7A, 7B, 7C, and 7D are cross-sectional views of a portion of a turbine assembly.
Figure 7B:
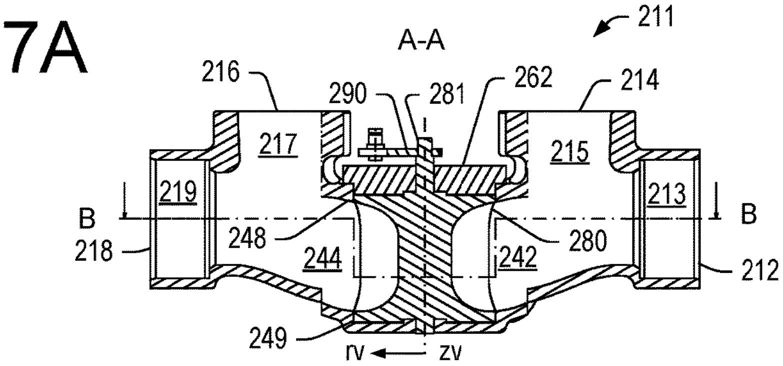
Figure 7C:
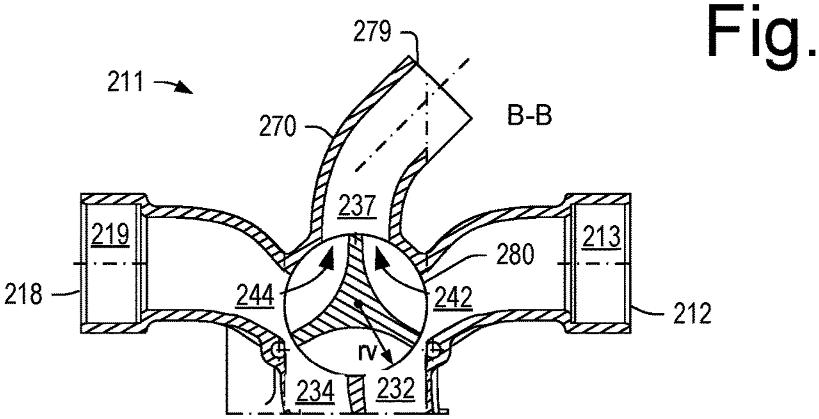
Figure 7D:
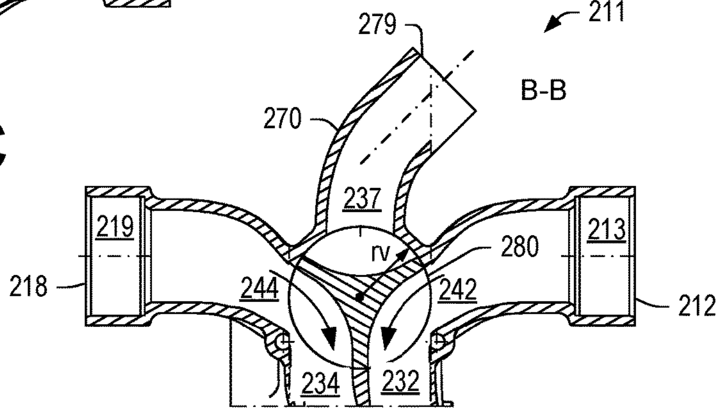

FIG. 7A, FIG. 7B, FIG. 7C, and FIG. 7D show cross-sectional views through the manifold 211 of the turbine assembly of FIG. 5A and FIG. 5B. In particular, the views of FIG. 7A and FIG. 7B are along a line A-A as shown in FIG. 5B and the views of FIG. 7C and FIG. 7D are along a line B-B as shown in FIG. 7A and FIG. 7B.

In FIG. 7C and FIG. 7D, the valve element 280 is in two different positions where the position of the valve element 280 in FIG. 7C is a restricted position for flow from the passages 242 and 244 to passages 232 and 234, respectively, where the passages 232 and 234 lead to one or more scrolls of the turbine housing 210, and where the position of the valve element 280 in FIG. 7D is an open position (e.g., unrestricted position) for flow from the passages 242 and 244 to passages 232 and 234, respectively.

As shown in FIG. 7C and FIG. 7D, the EGR conduit 270 forms the passage 237 where in the restricted position of FIG. 7C, gas can flow from the passage 242 and from the passage 244 to the passage 237; whereas, in the unrestricted position of FIG. 7D, gas cannot flow from the passage 242 or the passage 244 to the passage 237. In the example of FIG. 7C, braking may be effectuated along with EGR. In the example of FIG. 7C and FIG. 7D, the valve element 280 is rotated by approximately 30 degrees (e.g., plus or minus 10 degrees), which may be measured using a cylindrical coordinate system, for example, consider an azimuthal angle of a cylindrical coordinate system centered on zv.

Figure 8A:
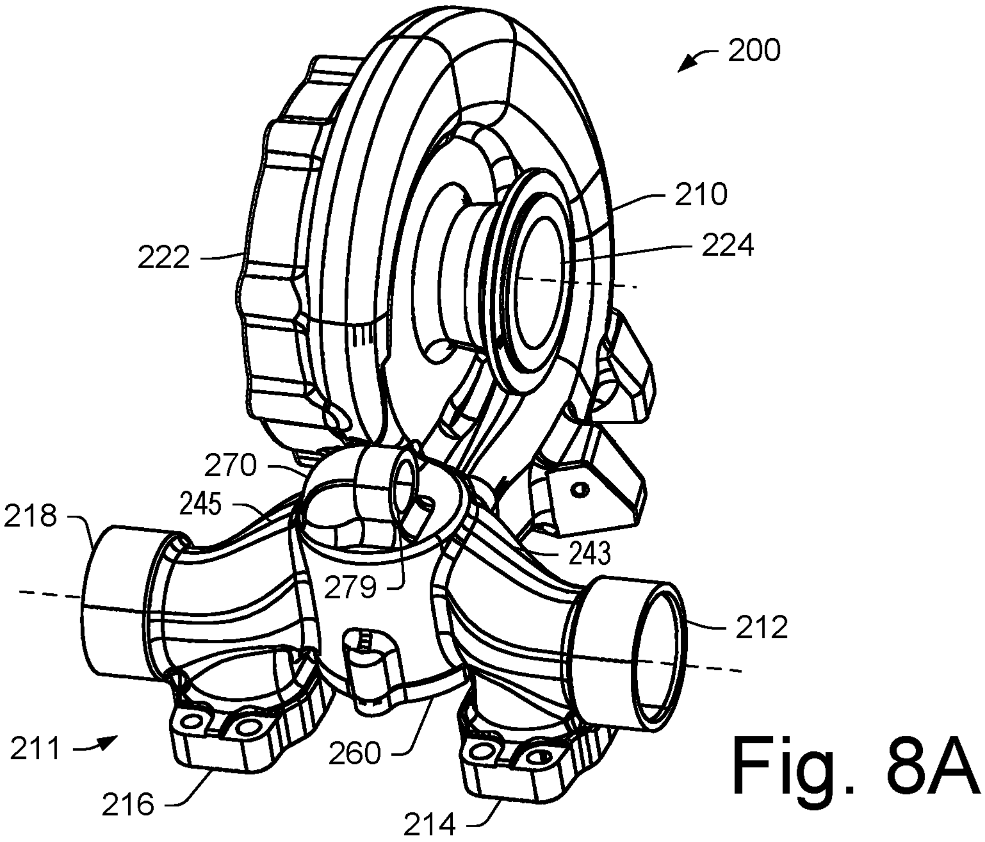
FIGS. 8A and 8B are diagrams of an example of a turbine assembly; Garrett Internal
Figure 8B:
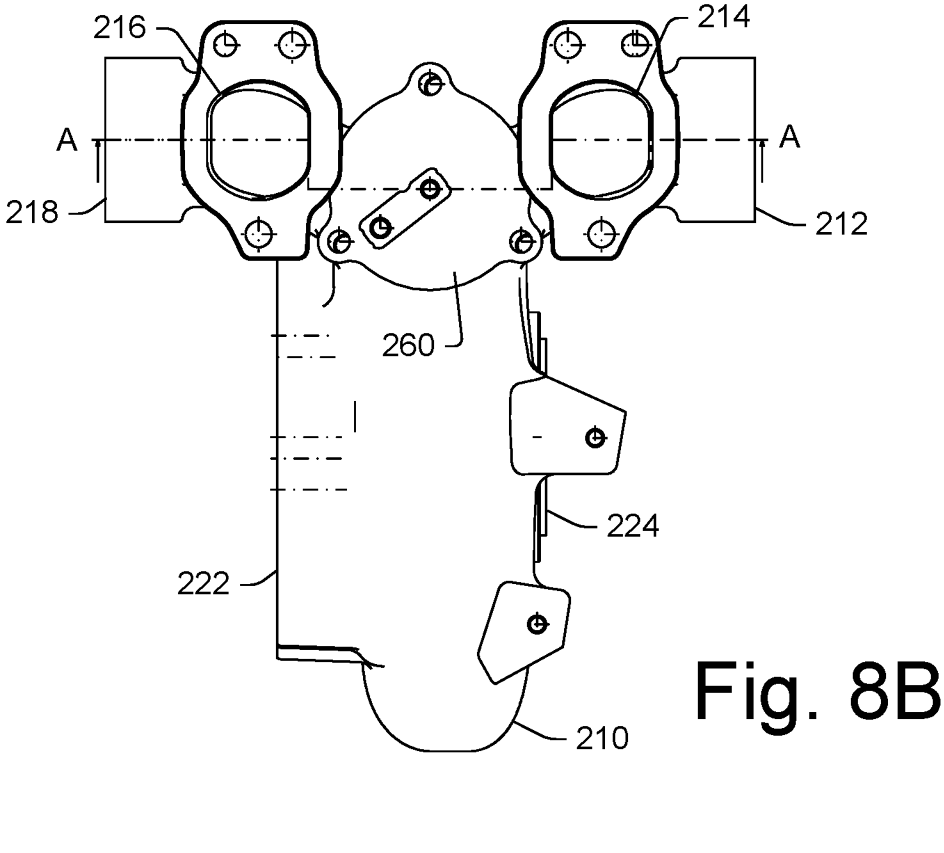

FIG. 8A and FIG. 8B show an example of the turbine assembly 200 as including the EGR conduit 270 that includes the EGR outlet 279 where the EGR conduit is at a side of the manifold 211 that is opposite the cap 262 of the valve assembly 260. As shown, the EGR conduit 270 in FIG. 8A is at an end side of the cylindrical valve seating portion of the manifold 211.

Figure 9A:
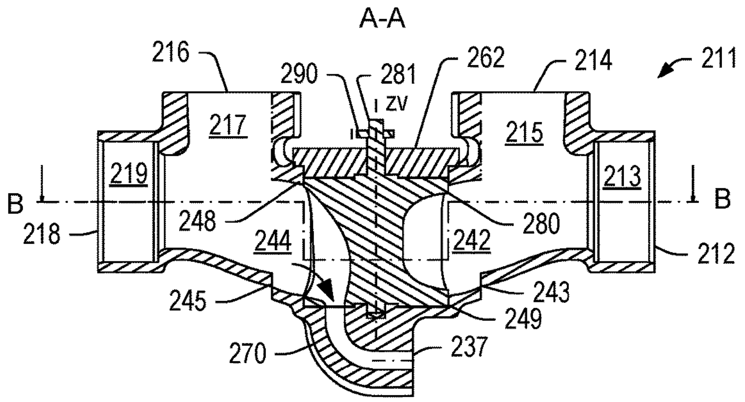
FIGS. 9A, 9B, 9C, and 9D are cross-sectional views of a portion of a turbine assembly.
Figure 9B:
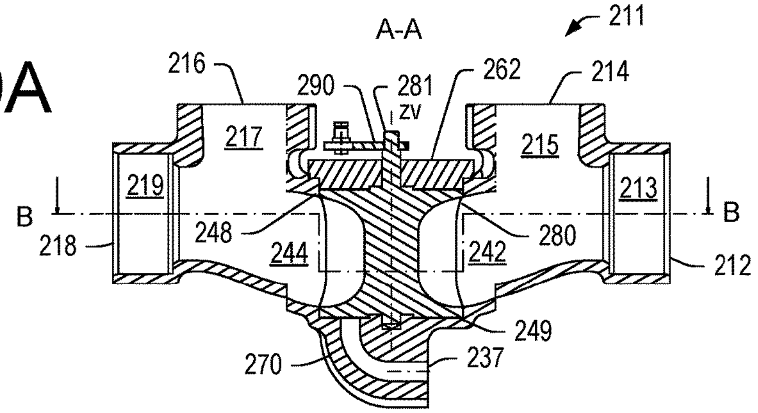
Figure 9C:
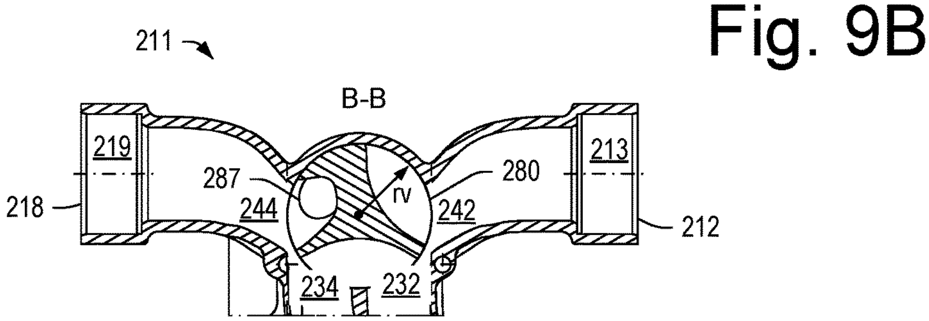
Figure 9D:
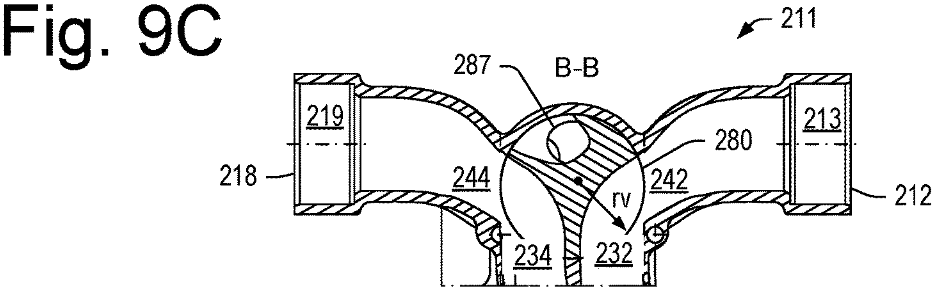
Figure 10A:
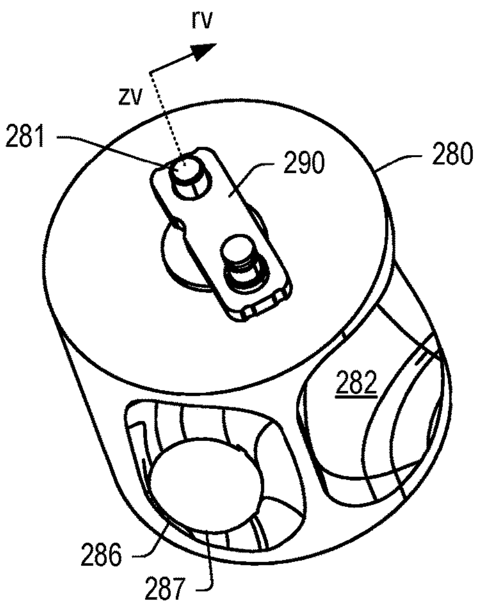
FIGS. 10A, 10B, 10C, and 10D are perspective views of an example of a valve element.
Figure 10B:
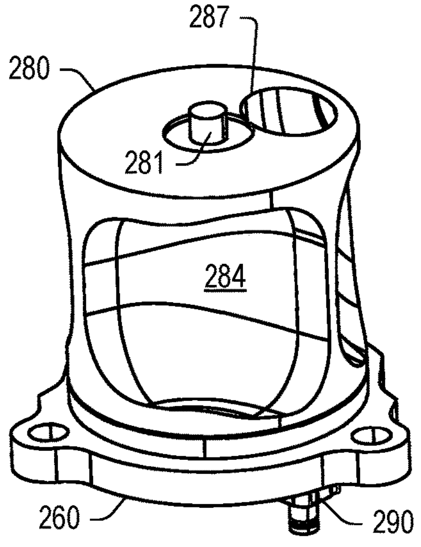
Figure 10C:
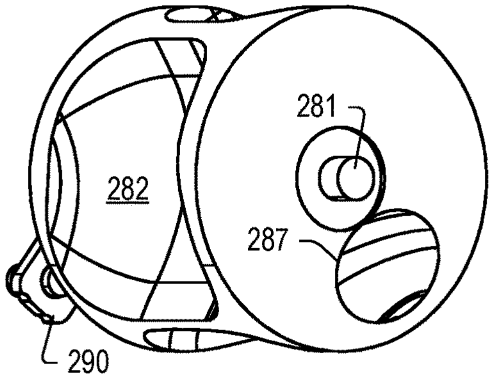
Figure 10D:
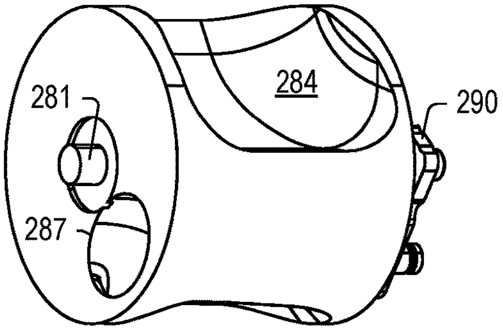

FIG. 9A, FIG. 9B, FIG. 9C, and FIG. 9D show cross-sectional views through the manifold 211 of the turbine assembly of FIG. 8A and FIG. 8B. In particular, the views of FIG. 9A and FIG. 9B are along a line A-A as shown in FIG. 8B and the views of FIG. 9C and FIG. 9D are along a line B-B as shown in FIG. 9A and FIG. 9B.

In FIG. 9A and FIG. 9C and in FIG. 9B and FIG. 9D, the valve element 280 is in two different positions where the position of the valve element 280 in FIG. 9A and FIG. 9C is a restricted position for flow from the passages 242 and 244 to passages 232 and 234, respectively, where the passages 232 and 234 lead to one or more scrolls of the turbine housing 210, and where the position of the valve element 280 in FIG. 9B and FIG. 9D is an open position (e.g., unrestricted position) for flow from the passages 242 and 244 to passages 232 and 234, respectively.

As shown, the EGR conduit 270 forms the passage 237 where in the restricted position of FIG. 9A and FIG. 9C, gas can flow from the passage 244 to the passage 237; whereas, in the unrestricted position of FIG. 9B and FIG. 9D, gas cannot flow from the passage 242 or the passage 244 to the passage 237. In the example of FIG. 9A and FIG. 9C, braking may be effectuated along with EGR. In the example of FIG. 9C and FIG. 9D, the valve element 280 is rotated by approximately 30 degrees (e.g., plus or minus 10 degrees), which may be measured using a cylindrical coordinate system, for example, consider an azimuthal angle of a cylindrical coordinate system centered on zv.

FIG. 10A, FIG. 10B, FIG. 10C, and FIG. 10D show perspective views of the valve element 280 of FIG. 9A, FIG. 9B, FIG. 9C, and FIG. 9D. As shown, the valve element 280 can include a passage 287 in the recess 286 where the passage 287 is a side to end passage in that it provides for flow communication from a side of the valve element 280 to an end of the valve element 280. Such a passage can be suitable for use with an EGR conduit. As shown in FIG. 9A and FIG. 9B, the passage 237 can be in a valve seat 249 of the manifold 211 where the passage 287 can be aligned with the passage 237 (e.g., an opening thereof in the valve seat 249).

Figure 11A:
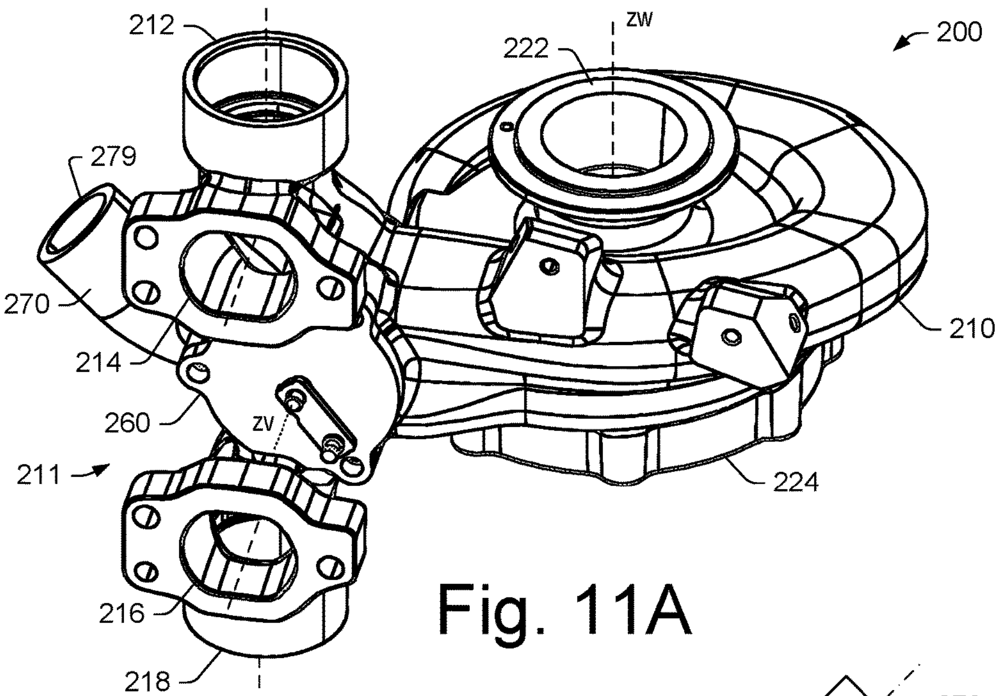
FIGS. 11A and 11B are diagrams of an example of a turbine assembly.
Figure 11B:
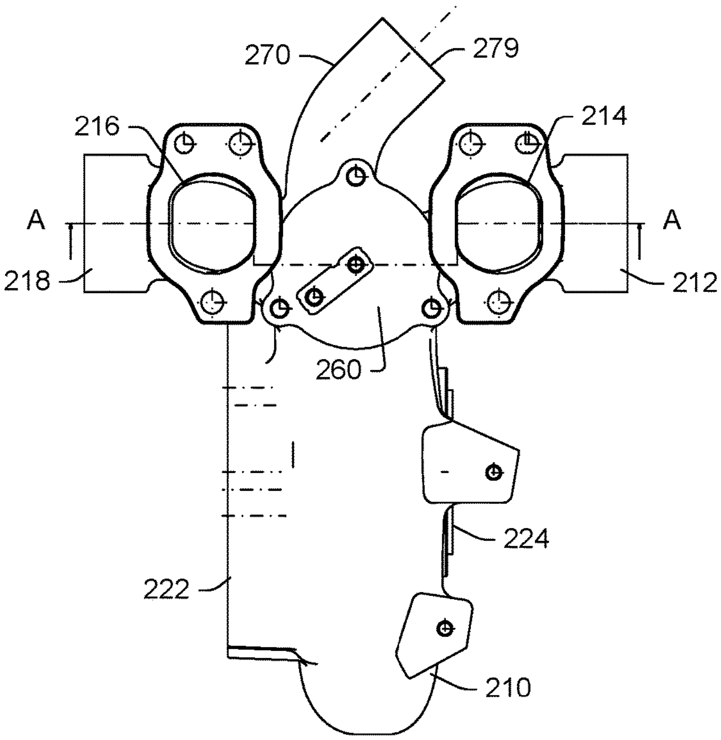

FIG. 11A and FIG. 11B show an example of the turbine assembly 200 as including the EGR conduit 270 that includes the EGR outlet 279.

Figure 12A:
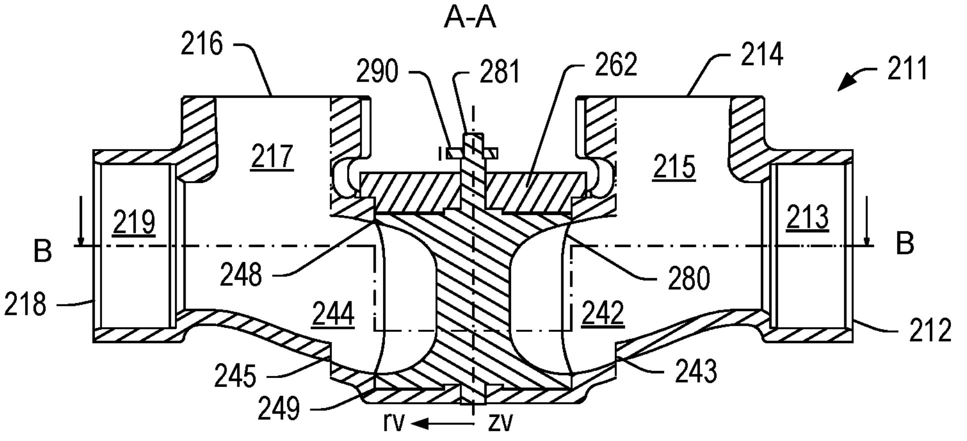
FIGS. 12A, 12B, 12C, 12D, 12E, and 12F are cross-sectional views of a portion of a turbine assembly.
Figure 12B:
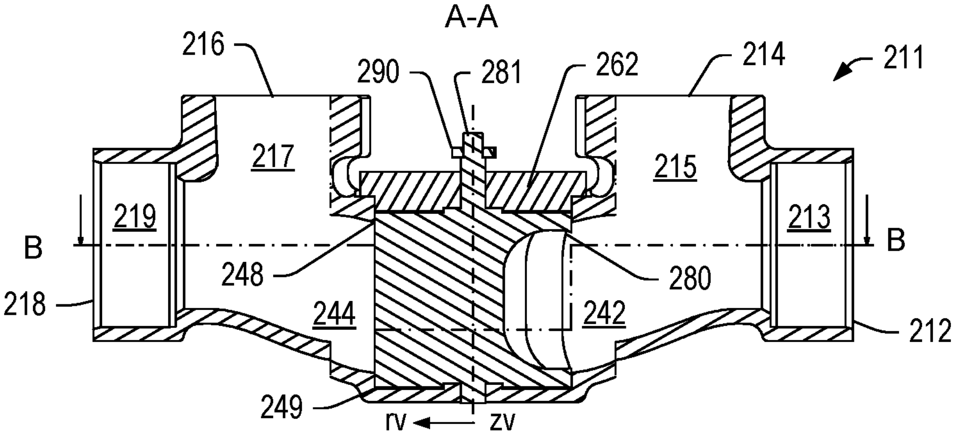
Figure 12C:
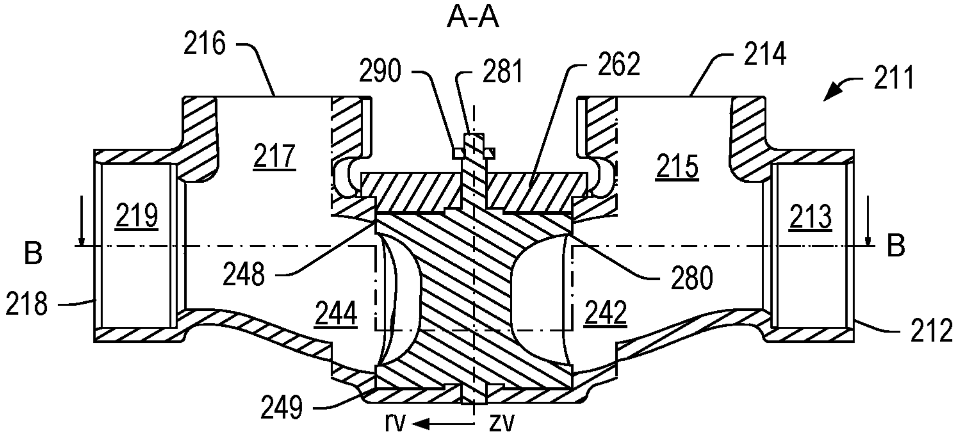
Figure 12D:
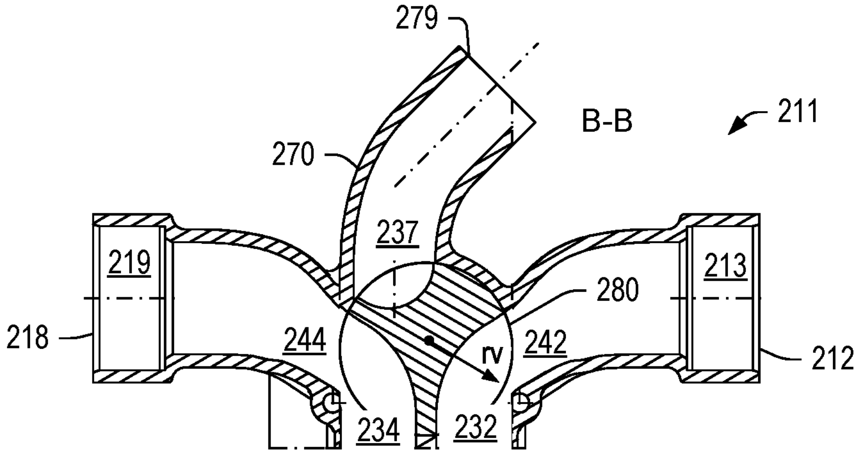
Figure 12E:
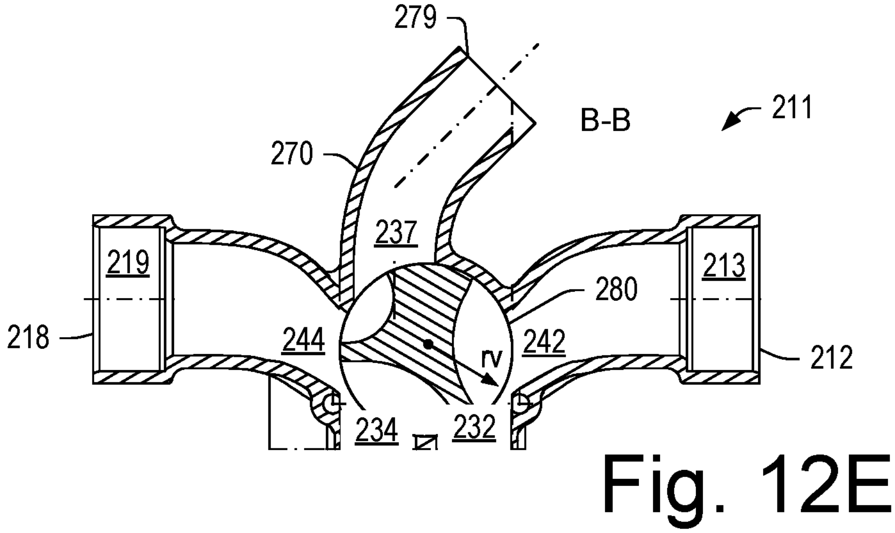
Figure 12F:
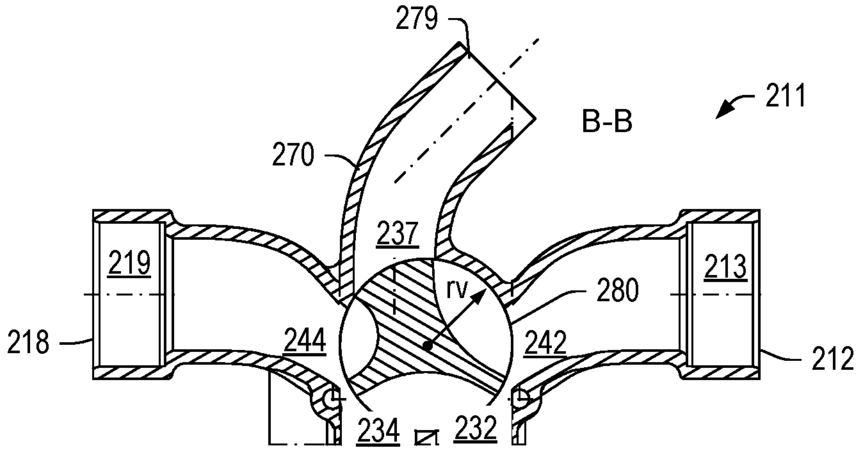

FIG. 12A, FIG. 12B, FIG. 12C, FIG. 12D, FIG. 12E, and FIG. 12F show cross-sectional views through the manifold 211 of the turbine assembly of FIG. 11A and FIG. 11B. In particular, the views of FIG. 12A, FIG. 12B, and FIG. 12C are along a line A-A as shown in FIG. 11B and the views of FIG. 12D, FIG. 12E, and FIG. 12F are along a line B-B as shown in FIG. 12A, FIG. 12B, and FIG. 12C.

In FIG. 12A and FIG. 12D, FIG. 12B and FIG. 12E, and in FIG. 12C and FIG. 12F, the valve element 280 is in three different positions where the position of the valve element 280 in FIG. 12C and FIG. 12F is a restricted position for flow from the passages 242 and 244 to passages 232 and 234, respectively, where the passages 232 and 234 lead to one or more scrolls of the turbine housing 210, and where the position of the valve element 280 in FIG. 12A and FIG. 12D is an open position (e.g., unrestricted position) for flow from the passages 242 and 244 to passages 232 and 234, respectively. As to FIG. 12B and FIG. 12E, these cross-sectional views show the position of the valve element 280 in an intermediate position that allows for some flow from the passage 244 to the passage 237 and some flow from the passage 244 to the passage 234, along with some amount of flow from the passage 242 to the passage 232. In the example of FIG. 12B and FIG. 12E, braking may be effectuated along with EGR; whereas, in the example of FIG. 12C and FIG. 12F, braking may be effectuated without EGR. In the example of FIG. 12D and FIG. 12E, the valve element 280 is rotated by approximately 30 degrees (e.g., plus or minus 10 degrees), which may be measured using a cylindrical coordinate system, for example, consider an azimuthal angle of a cylindrical coordinate system centered on zv. In the example of FIG. 12E and FIG. 12F, the valve element 280 is rotated by approximately 30 degrees (e.g., plus or minus 10 degrees), which may be measured using a cylindrical coordinate system, for example, consider an azimuthal angle of a cylindrical coordinate system centered on zv.

Figure 13A:
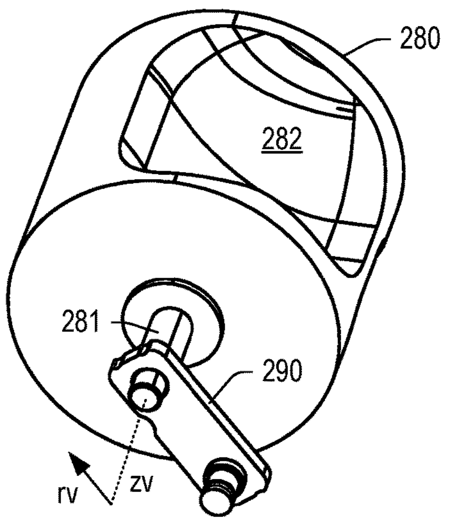
FIGS. 13A, 13B, and 13C are perspective views of an example of a valve element.
Figure 13B:
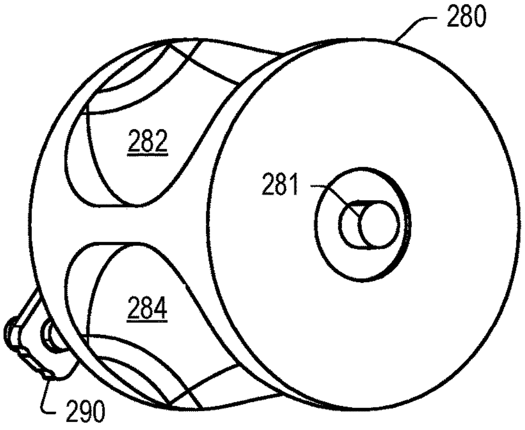
Figure 13C:
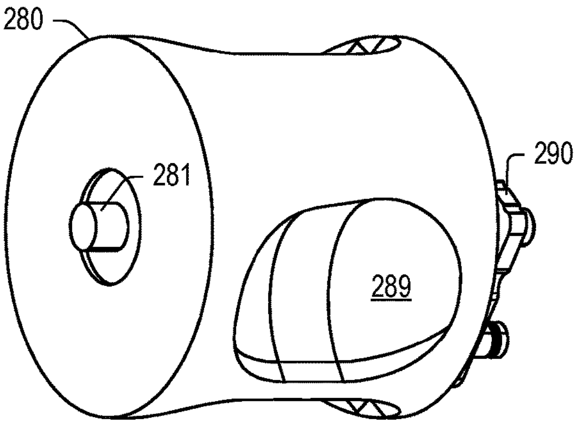

FIG. 13A, FIG. 13B, and FIG. 13C show perspective views of the valve element 280 of FIG. 12A, FIG. 12B, FIG. 12C, FIG. 12D, FIG. 12E, and FIG. 12F. As shown, the valve element 280 can include three recesses 282, 284 and 289 where the recess 289 is smaller than the recesses 282 and 284. As shown in FIG. 12E, the smaller recess 289 can be an EGR recess that can be used to effectuate EGR flow while also allowing for one or more other recesses to effectuate through flow to one or more scrolls of a turbine housing.

Figure 14:
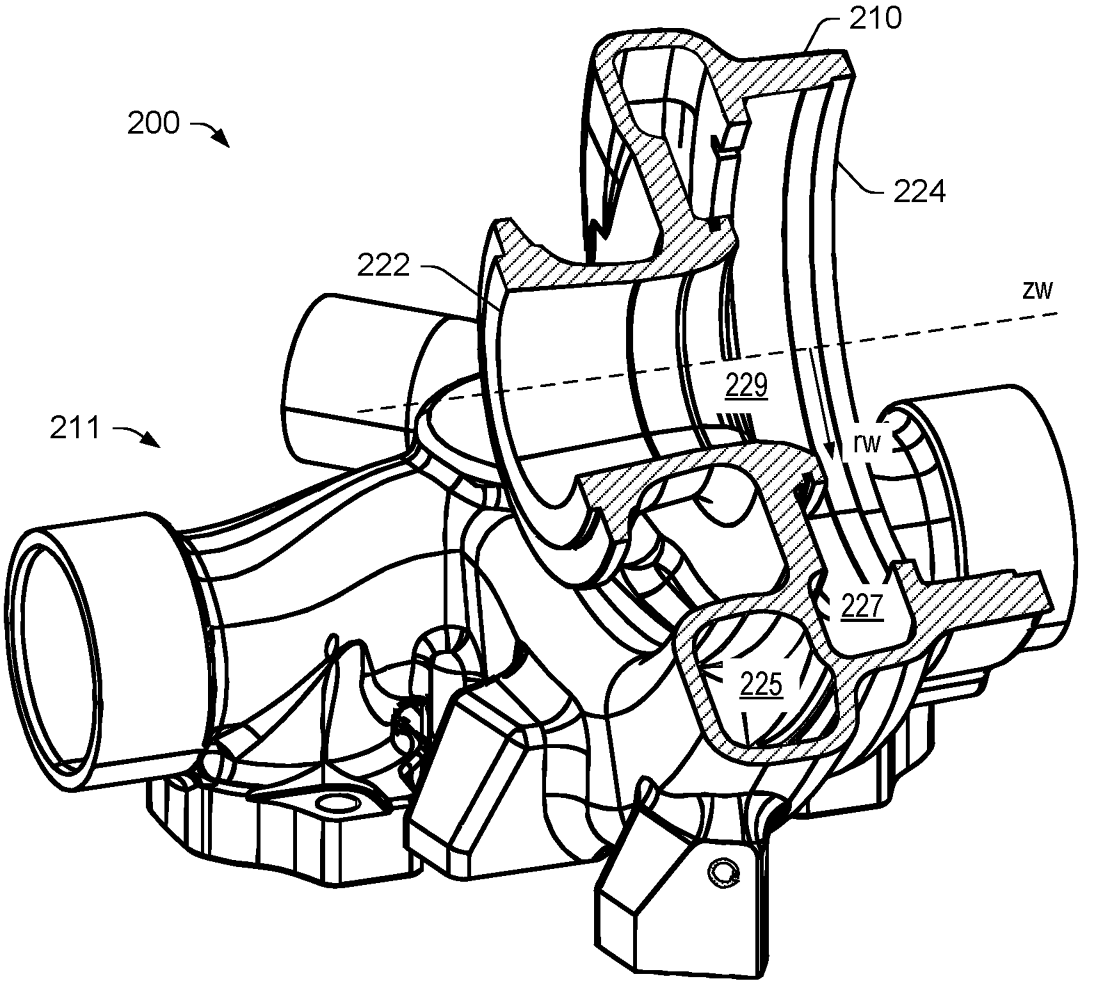
FIG. 14 is a cutaway view of an example of a turbine assembly.

FIG. 14 shows a cutaway view of a portion of an example of the turbine assembly 200 where two scrolls 225 and 227 (e.g., a twin scroll turbine assembly) are shown that can direct gas to a turbine wheel space 229. In various examples, the passages 232 and 234 can be for different scrolls such as, for example, one for the scroll 225 and another for the scroll 227. As shown, the turbine assembly 200 can be defined using one or more coordinate systems, which may include one or more cylindrical coordinate systems and/or one or more Cartesian coordinate systems. As shown in FIG. 14, the turbine wheel space 229 can include the axis zw that can be aligned with a rotational axis of a turbine wheel where, for example, one or more features may be defined with respect to a radial coordinate rw and, for example, an azimuthal angle (e.g., a coordinate angle).

As an example, a turbine assembly can include a valve for restricting flow coming into a turbine, which can result in back pressure and braking. As an example, a valve may be a braking valve for braking an engine. As an example, a valve can include an EGR passage where exhaust may be directed to a passage that circulates the exhaust to an intake of an engine.

As an example, a valve can be substantially cylindrically shaped with separate recesses. In such an example, the valve may be rotatable in a valve seat, which may provide for more reliable operation compared to a flapper valve that includes a flap on an arm (e.g., a swinging flap). As an example, a rotatable, substantially cylindrical valve can demand less force to operate and hence may employ a lighter actuator and/or an actuator rated at a less power compared to a flapper valve, which may have to be actuated with an amount of force sufficient to overcome exhaust pressure (e.g., including pulsations in exhaust pressure).

As an example, a turbine assembly with a rotatable valve may provide for increasing back pressure for purposes of thermal management of an engine. For example, an increase in back pressure may result in a decreased time to an operational temperature of an engine. For example, an increase in back pressure can cause an engine to heat up faster.

As explained, a turbine assembly with a rotatable valve and separate recesses can be operable for one or more purposes. As explained, a controller may implement one or more control schemes for such a rotatable valve, for example, for an increase or a decrease in back pressure, for EGR, etc. In various examples of a turbine assembly, given the location of the rotatable valve, when back pressure is created, it may be created in a manner that restricts flow in a relatively even manner to two scrolls of a twin scroll turbine housing. For example, consider FIG. 3C where flow is substantially evenly restricted to passages 234 and 232. Also consider FIG. 6C where flow is substantially evenly restricted to passages 234 and 232 while back pressure may be lesser for cylinders associated with the inlets 216 and 218 (e.g., due to EGR). Additionally, consider FIG. 7C where flow is substantially evenly restricted to passages 234 and 232 where EGR can be substantially the same for all cylinders. Yet further, consider FIG. 9C where flow is substantially evenly restricted to passages 234 and 232. As explained, a valve may not restrict flow completely, for example, some amount of space can exist for a relatively small amount of flow, which may be beneficial for one or more purposes, for example, to provide for some amount of rotation of a turbine wheel disposed in a turbine wheel space of a turbine housing. In such an example, a bearing system of a turbine may be able to continue to rotate and/or otherwise distribute lubricant, which may, for example, help to reduce bearing wear, etc. For example, consider one or more lubricated roller bearings and/or one or more lubricated ring bearings in a center housing of a turbine that supports a shaft and turbine wheel assembly (SWA) where rotation of the SWA can be beneficial for lubrication, reduced wear, reduced coking of lubricant, etc. As an example, where a valve is designed to provide for less than complete restriction of flow, concerns as to leakage may be reduced. In other words, a valve may be for purposes of back pressure generation and/or EGR, without have a purpose of completely restricting flow to scrolls of a turbine housing.

As an example, a turbine assembly may be for an inline cylinder engine and/or for a V-shaped or opposing (e.g., 180 degree) cylinder engine (e.g., gasoline, diesel, hydrogen, etc.). As an example, an inline cylinder engine may include six cylinders where, for example, the turbine assembly includes a manifold with four inlets. In such an example, two of the four inlets can include flanges that can bolt to an engine to receive exhaust from cylinders 3 and 4 while one of the other inlets can receive exhaust from cylinders 1 and 2 and the other one of the other inlets can receive exhaust from cylinders 5 and 6. For example, in FIG. 2A and FIG. 2B, the inlet 212 can be for cylinders 1 and 2, the inlet 214 can be for cylinder 3, the inlet 216 can be for cylinder 4, and the inlet 218 can be for cylinders 5 and 6. As an example, a firing order for a six cylinder engine may be 1-5-3-6-2-4. In such an example, an inlet order can be defined as inlet 212, inlet 218, inlet 214, inlet 218, inlet 212, and inlet 216. As an example, one or more other types of arrangements may be utilized. As explained, a turbine housing can be a twin scroll turbine housing. As explained, a turbine assembly may be a cast component that is cast with a turbine housing and a manifold where a bolted connection is not required (e.g., being cast as a unitary component, no bolts are required to bolt the turbine housing portion to the manifold portion). In such an example, a gasket or gaskets are not required between a manifold and a turbine housing as would be required at a bolted interface.

As an example, a turbine assembly can include a valve upstream of a turbine where the valve can generate and modulate a range of pressure differences, which may be from relatively small pressures differences (e.g., EGR, etc.) to relatively high pressures differences (e.g., for engine braking, etc.). As explained, a turbine assembly may provide for thermal management, where, for example, an amount of exhaust flow can be controlled to bypass a turbine. In such an example, the amount of exhaust flow to bypass may be from a small percentage (e.g., a few percent) to large percentage (e.g., greater than 85 percent), where, for example, a maximum may be 100 percent or less than 100 percent (e.g., to allow for at least some flow to a turbine wheel, which may, for example, be in a range from approximately 0.25 percent to approximately 15 percent).

As an example, a turbine assembly (see, e.g., the turbine assembly 200) can include a manifold (see, e.g., the manifold 211) that includes separate conduits (see, e.g., the conduits 243 and 245) for receipt of exhaust from a first number of cylinders and a second number of cylinders, turbine inlet passages (see, e.g., the passages 232 and 234) and a valve seat (see, e.g., the valve seat 249) disposed between the separate conduits and the turbine inlet passages; and a valve (see, e.g., the valve element 280) set in the valve seat that includes a rotational axis and an outer surface that includes separate recesses, where rotation of the valve controls exhaust flow from the separate conduits to the turbine inlet passages.

As an example, a turbine assembly can include a manifold that includes separate conduits for receipt of exhaust from a first number of cylinders and a second number of cylinders, turbine inlet passages and a valve seat disposed between the separate conduits and the turbine inlet passages; and a valve set in the valve seat that includes a rotational axis and an outer surface that includes separate recesses, where rotation of the valve controls exhaust flow from the separate conduits to the turbine inlet passages. In such an example, the manifold can include exhaust flanges for manifold inlet passages. For example, the manifold may bolt to a cylinder head of an engine. As an example, a manifold may be part of a cylinder head of an engine. As an example, a manifold may include flanges that can couple to another manifold. For example, consider a first manifold that couples to an engine where the manifold of a turbine assembly can be a second manifold that couples to the first manifold.

As an example, a first number of cylinders can be at least two and a second number of cylinders can be at least two. For example, consider a four cylinder engine or an engine with more than four cylinders.

As an example, a turbine assembly can include turbine inlet passages that join to feed a single turbine housing scroll or turbine inlet passages that feed separate turbine housing scrolls.

As an example, an outer surface of a rotating body of a valve can include three separate recesses. Such recesses may be concave as may be formed into a cylindrical body where the recesses can be separated by portions of an outer surface of the cylindrical body. In such an example, a recess may be defined according to a pie shaped section of a cylinder. For example, consider three separate recesses that may be defined by separate pie shaped sections of a cylinder. As explained, a valve body may include a contiguous outer surface that surrounds each of the recesses. As an example, a valve body may be defined by an outer diameter (e.g., outer radius) where each recess can be defined by one or more radii that are less than the outer radius. As explained, a valve body can include a central axis that can be part of a cylindrical coordinate system, which can be used to define surfaces, recesses, pie shaped sections, etc.

As an example, a valve seat can include an exhaust gas recirculation opening. In such an example, a valve can include a passage that includes a first opening on an outer surface of the valve (e.g., between axial end faces) and a second opening on an axial face of the valve, where rotation of the valve aligns the second opening and the exhaust gas recirculation opening.

As an example, rotation of a valve can fluidly couple, via one of a number of separate recesses of the valve, at least one of a number of separate conduits for a first number of cylinders or a second number of cylinders and an exhaust gas recirculation opening.

As an example, separate recesses of a valve can include symmetrical recesses, symmetrical about a plane of symmetry that passes through a rotational axis of the valve. As explained, recesses may be defined in part by pie shaped sections of a cylinder. In such an approach, recesses may be compared by comparing separate pie shaped sections (e.g., via rotation of one section with respect to another, etc.).

As an example, a turbine assembly can include a valve that includes an exhaust engine braking position. In such an example, flow may be at least in part restricted with a purpose to increase pressure in conduits from cylinders, so as to enhance engine brake performance.

As an example, a turbine assembly can include a valve that includes an exhaust gas recirculation positon. In such an example, flow may be restricted with the purpose to increase pressure in conduits from cylinders, so as to facilitate exhaust gas recirculation to an engine intake (e.g., engine inlet).

As an example, a turbine assembly can include a valve that includes a full turbine flow position, for example, without significant restriction of the flow from separate conduits to a turbine inlet.

As an example, a method can include, for a turbine assembly that includes a manifold that includes separate conduits for receipt of exhaust from a first number of cylinders and a second number of cylinders, turbine inlet passages and a valve seat disposed between the separate conduits and the turbine inlet passages; and a valve set in the valve seat that includes a rotational axis and an outer surface that includes separate recesses, rotating the valve to flow exhaust from the separate conduits to the turbine inlet passages. In such an example, the method can include rotating the valve to an engine braking position that increases exhaust backpressure for the first number of cylinders and/or the second number of cylinders and/or can include rotating the valve to an exhaust gas recirculation position that directs exhaust gas flow to an engine intake passage. As explained, in various examples, a turbine assembly with a valve may be configured to not completely restrict flow to a scroll or scrolls of a turbine housing. For example, in back pressure position of a valve, some amount of exhaust may still flow to one or more scrolls of a turbine housing, where, for two scrolls, the valve can allow for some amount of flow to each of the two scrolls where the amount is substantially even (e.g., plus or minus 15 percent, etc.). As explained, some amount of flow may for one or more beneficial purposes (e.g., maintaining a desired amount of turbine wheel rotation, etc.).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine assembly comprising:

a manifold that comprises separate conduits for receipt of exhaust from a first number of cylinders and a second number of cylinders, turbine inlet passages separated by a wall, and a valve seat disposed between the separate conduits and between the separate conduits and the turbine inlet passages; and a valve set in the valve seat that comprises a rotational axis and an outer surface that comprises three separate recesses disposed in three corresponding pie shaped sections separated by portions of the outer surface of the valve, wherein controlled rotation of the valve to a position that aligns one of the portions of the outer surface of the valve with the wall provides for unrestricted exhaust flow from the separate conduits to the turbine inlet passages, and wherein controlled rotation of the valve to a different position that does not align the one of the portions of the outer surface of the valve with the wall provides for restriction of exhaust flow from the separate conduits to the turbine inlet passages.

2. The turbine assembly claim 1, wherein the manifold comprises exhaust flanges for manifold inlet passages.

3. The turbine assembly of claim 1, wherein the first number of cylinders is at least two and wherein the second number of cylinders is at least two.

4. The turbine assembly of claim 1, wherein the turbine inlet passages join to feed a single turbine housing scroll.

5. The turbine assembly of claim 1, wherein the turbine inlet passages feed separate turbine housing scrolls.

6. The turbine assembly of claim 1, wherein the valve seat comprises an exhaust gas recirculation opening.

7. The turbine assembly of claim 6, wherein the valve comprises a passage that comprises a first opening on the surface of the valve and a second opening on an axial face of the valve, wherein rotation of the valve aligns the second opening and the exhaust gas recirculation opening.

8. The turbine assembly of claim 6, wherein rotation of the valve fluidly couples, via one of the separate recesses, at least one of the separate conduits for the first number of cylinders or the second number of cylinders and the exhaust gas recirculation opening.

9. The turbine assembly of claim 1, wherein the valve comprises an exhaust engine braking position.

10. The turbine assembly of claim 1, wherein the valve comprises an exhaust gas recirculation position.

11. The turbine assembly of claim 1, wherein the valve comprises a full turbine flow position.

12. A method comprising:

for a turbine assembly that comprises a manifold that comprises separate conduits for receipt of exhaust from a first number of cylinders and a second number of cylinders, turbine inlet passages separated by a wall, and a valve seat disposed between the separate conduits and between the separate conduits and the turbine inlet passages; and a valve set in the valve seat that comprises a rotational axis and an outer surface that comprises three separate recesses disposed in three corresponding pie shaped sections separated by portions of the outer surface of the valve, rotating the valve to a position that aligns one of the portions of the outer surface of the valve with the wall to transition from restricted to unrestricted flow of exhaust from the separate conduits to the turbine inlet passages.

13. The method of claim 12, comprising rotating the valve to a different position that is an engine braking position that restricts flow of exhaust to increase exhaust backpressure for the first number of cylinders and/or the second number of cylinders.

14. The method of claim 12, comprising rotating the valve to a different position that is an exhaust gas recirculation position that directs exhaust gas flow to an engine intake passage.

15. The turbine assembly of claim 1, wherein the valve seat comprises an opening for insertion of the valve.

16. The turbine assembly of claim 15, wherein the manifold comprises exhaust flanges for manifold inlet passages, wherein respective openings of two of the exhaust flanges and the opening of the valve seat face a common direction, wherein the two of the exhaust flanges are separated by a space defined at least in part by features of a cylinder head of an internal combustion engine for bolting of the two of the exhaust flanges to the cylinder head, and wherein the opening of the valve seat is accessible via the space.

17. The turbine assembly of claim 15, comprising a cap positioned to close the opening of the valve seat with the valve seated in the valve seat.

18. The turbine assembly of claim 17, comprising an axle coupled to the valve that extends through an opening of the cap, wherein the valve is rotatable via the axle.

19. The turbine assembly of claim 18, comprising a control arm operatively coupled to the axle for controllably rotating the valve.

* * * * *